Sept. 6, 1949.                H. J. KERR ET AL.                2,480,863
                                WELDING APPARATUS
Original Filed March 21, 1944                            2 Sheets-Sheet 1
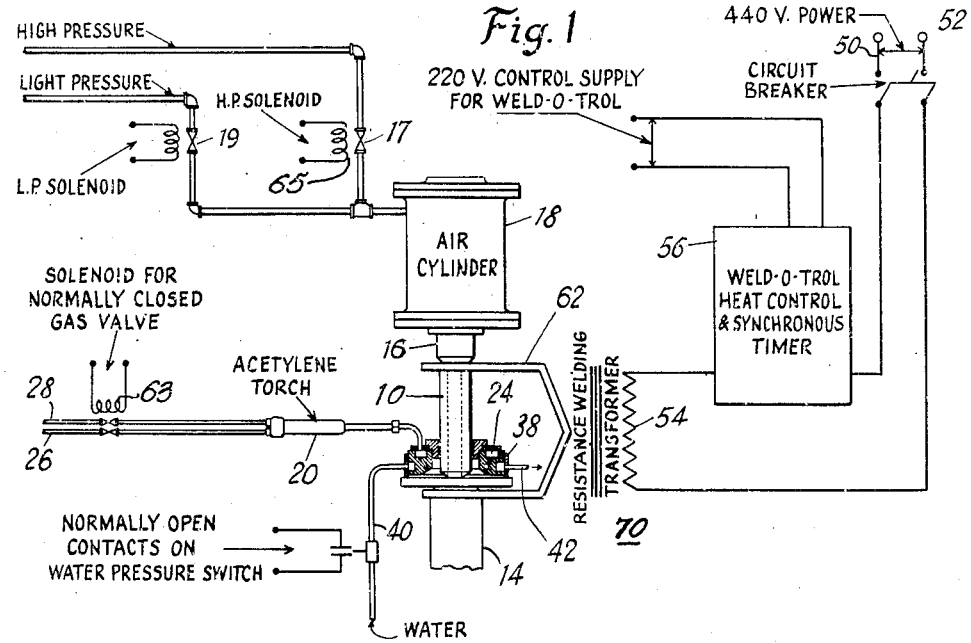
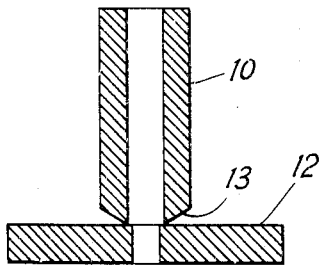
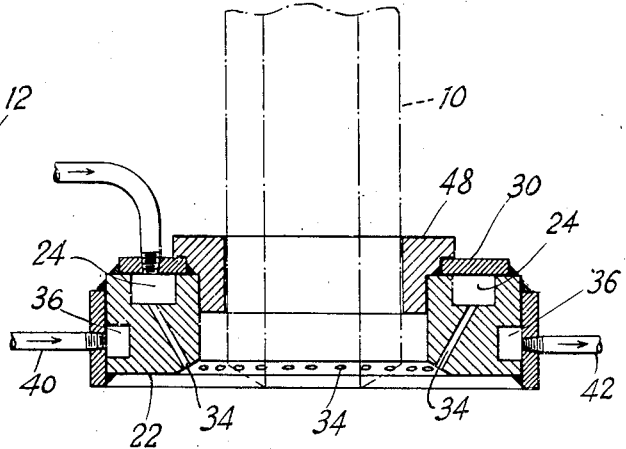
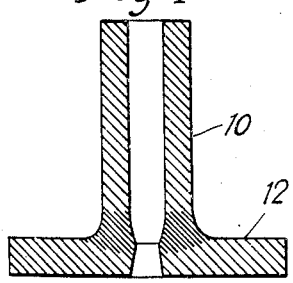
INVENTORS
OTIS R. CARPENTER
FRANK W. ARMSTRONG, JR.
NICHOLAS JESSEN &
HOWARD J. KERR
BY R. M. Holbrook
ATTORNEY

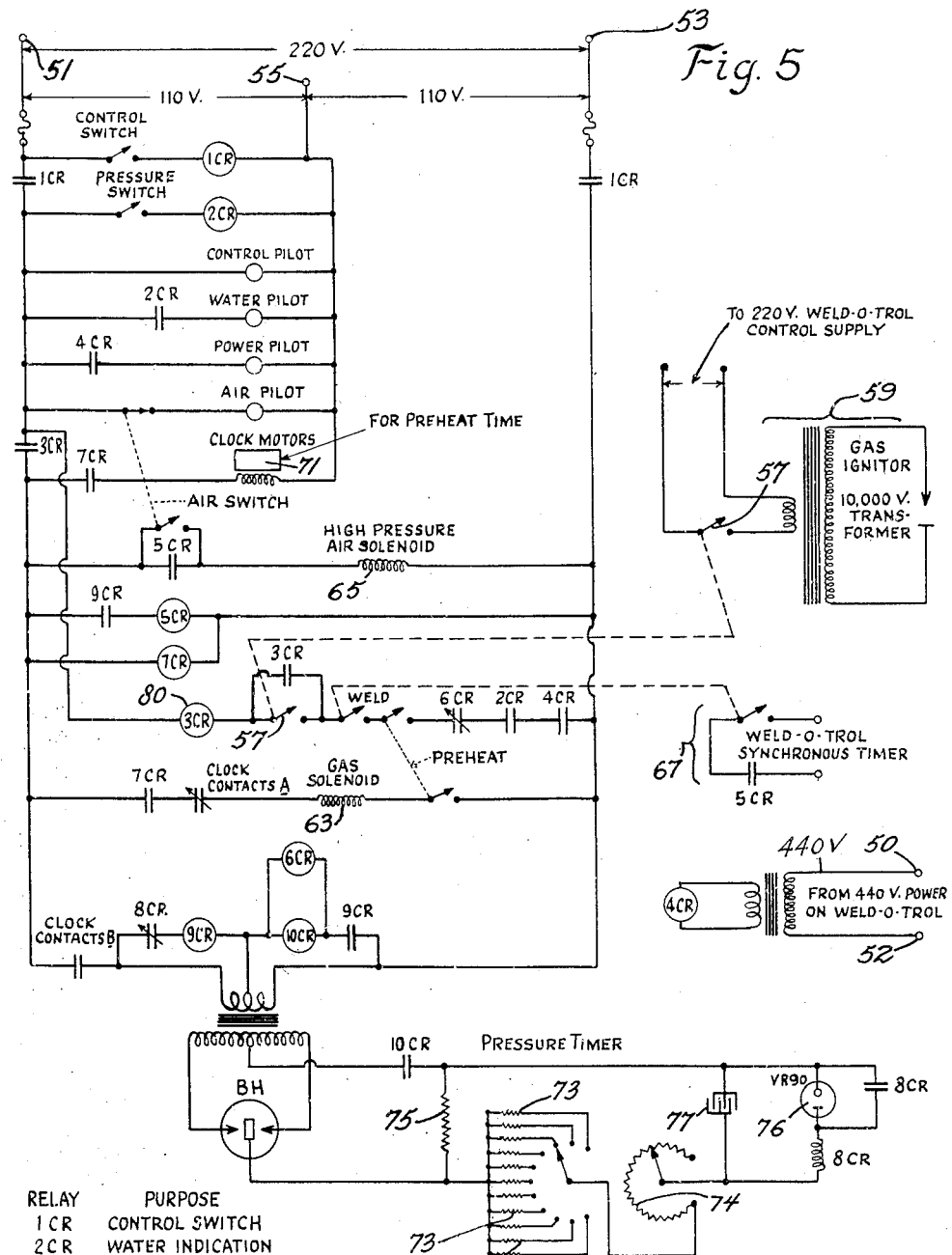

Patented Sept. 6, 1949

2,480,863

UNITED STATES PATENT OFFICE 2,480,863

WELDING APPARATUS

Howard J. Kerr, Westfield, N. J., Otis R. Carpenter and Frank W. Armstrong, Jr., Barberton, and Nicholas C. Jessen, Akron, Ohio, assignors to The Babcock & Wilcox Company, Rockleigh, N. J., a corporation of New York Original application March 21, 1944, Serial No. 527,432. Divided and this application March 27, 1946, Serial No. 657,424. In Great Britain April 3, 1945

8 Claims. (Cl. 219—4)

1

This invention relates to a system of electrical resistance butt welding in which all of the welding heat is not supplied by the electrical resistance of the electric current passage through the juncture alone, as is customary in this type of welding, but is partially supplied by a preheating system applied before the application of an electric current.

An object of this invention is to provide a method of electrical resistance butt welding which will reliably produce good welds without the uncertain aspects commonly associated with straight electric resistance butt welding.

Another object is to provide a system of welding in which the care or preparation of weld surfaces need not be as particular as is common for electric resistance butt welding.

A further object is to reduce the current density requirement per unit of area welded over that customarily required for electric resistance butt welding.

Another object is to provide a means for expelling oxides and dirt from the fusion zone of the weld, which is not possible with common electric resistance butt welding, but at the same time avoiding the large flash and spatter associated with electric flash welding.

A further object is to make possible the welding of alloy steels such as low chrome alloys, austenitic materials and high chrome alloys, heretofore impossible in common electric resistance butt welding.

An ancillary object of this invention is to provide a novel arrangement for the automatic control of the components of the system of welding by means of an interlocked electrical control circuit thereby providing for absolute reproducibility of results.

Other objects of the invention will appear in the accompanying description which refers to the drawings in which apparatus for carrying out the illustrative method is diagrammatically illustrated.

In the drawings:

Fig. 1 is a diagrammatic view of apparatus employed in practicing the invention;

Fig. 2 is a vertical section of the oxy-acetylene burner or heating ring employed in the Fig. 1 apparatus;

Fig. 3 is a vertical section showing work elements as they are associated at the initiation of the illustrative method;

Fig. 4 is a vertical section through the work after the weld has been completed; and Fig. 5 is a schematic diagram of the electrical control apparatus and circuit for effecting the illustrative method.

The welding operation is illustrated in the drawings by the juncture of a tubular section, such as 10, to a plate section or flange piece 12. Other components or sections can also be successfully joined. The tube 10 is first machined at one end to form a conical surface 13, limiting the area of contact. These elements are then set-up and abutted together as indicated in Fig. 1, with the reduced contact surface of the machined tube end abutted against the flange piece and the two pieces arranged in operative relationship between the fixed member 14 and the movable member 16 of the pressure apparatus having the air cylinder 18, the inlet of which is connected with a high pressure valve 17 and a low pressure valve 19. During the operative assembly, a preheating device is disposed around the tube at the weld zone. As shown, the preheater includes the acetylene burner, indicated in its entirety at 20, placed at a position around the tube and adjusted in height to a fixed distance above the flange piece 12. This burner is so disposed and constructed as to have its flames impinge upon the metal of the flange piece which involves the predominating part of the metal in the weld zone.

The specific structure of the acetylene torch is shown in Fig. 2, and it involves a metallic body 22 having an annular gas chamber 24 formed therein, this gas chamber being connected by the tubes 26 and 28 to sources of oxygen and acetylene.

The gas chamber is indicated as closed by an annular ring 30 which is welded to the body 22 as shown in the drawing, and the combustible gaseous mixture is transmitted to the combustion zone by downwardly directed ducts 34 formed within the burner body. To prevent overheating of the burner, an annular water chamber 36 is formed in the body 22 by recessing a circumferential part of the latter and then surrounding the body 22 with a ring 38 welded to the body as shown. Through this ring extend tubes 40 and 42 which communicate with the water chamber for the circulation of water therethrough.

In order to prevent excessive heating of the tube 10 during welding, a seal ring 48, machined so as to closely fit the outside diameter of the tube 10 and the inside diameter of the burner body 22, is arranged as indicated in the drawings. This construction controls the shape of the fillet formed during the welding process as a result of the upsetting of the metal at the end of the tube. The seal ring, being made of steel, also protects the heating tip of the tube from damage which otherwise might result from an excessive upset at the weld. By adjusting the space between the ring and the tube, the ring and the burner, and the height of the burner above the flange, the degree of preheat may also be controlled as to its distribution in the flange and the tube.

Preliminary pressure is applied by the illustrative apparatus before the welding process begins. This pressure is applied by the operation of the air cylinder 18, and the pressure may vary with the materials employed. For steel, a preferred pressure has been found to be within the range of 400 and 500 pounds per square inch, in the contact area. This pressure is also a function of the degree of preheat desired.

After the application of preliminary pressure over the joint contact area between the tube 10 and the flange piece 12, the burner 20 is lighted and the heating of the metal at the joint is begun.

It is preferable that the oxy-acetylene flame be maintained neutral, since oxidation and carburization of the heated surfaces are equally undesirable. The inert atmosphere provided by the neutral flame envelope surrounding the heated surfaces of the weld assembly is relatively efficient in preventing oxidation, although such an atmosphere is not considered a prerequisite to this method of welding.

The preheating should proceed at such a rate that no premature melting of the metal surfaces occurs and the temperature of the entire cross-section rises reasonably uniformly. In the early stages of the heating, the expansion of the heated portion of the specimen effects a slight pressure increase in the air cylinder 18. This results in a load increase at the free end of the specimen over the original preheat pressure, and, as the preheating progresses, the increased load on the specimen and the plasticity of the hot metal result in a slight upset at the heated area. If the rate of heating is proper, the heated surfaces nearest the burner tips will now appear liquidous and the upset, due to preheat pressure at this instant, will be just sufficient to compensate for the expansion due to heating.

At this stage of the method, the preheater is preferably shut off, and a heavy current of electricity is instantly applied to the joint by means of the electrical system and equipment indicated schematically in Fig. 5, and described in detail below.

Simultaneously, with the application of electric current to the weld zone, the pressure on the work is increased to a value many times of that of the originally applied pressure. Pressures in excess of 4,000 pounds per square inch are successfully employed.

After the welding current is interrupted, the weld is permitted to "set" for a few seconds under the welding pressure, prior to its removal from the machine.

The degree of preheat obtained by the acetylene burner alone just prior to the application of current and welding pressure is such that the temperature of metal of the weld junction surface of the flange at the outer edge of the weld junction is approximately 2700 F. while temperature of the inner edge where tube and flange are in contact and under preliminary pressure is about 2350 F. Upon the application of electric current the inner edge temperature instantly rises to above 2700 F. and at the same time, because of the rapid rate of upset, the current passage raises the entire zone of the weld to a temperature at or beyond the liquidous temperature. Thus the heat gradient at the weld zone is evened out and the weld is made while the junction zone is heated to fusion temperatures over an extremely localized area without a flashing action as is commonly present with flash welding, and yet with the metal heated to temperatures in excess of those commonly associated with electric butt welding. At the same time, there is associated with the process a "magnetic blow" away from the inner electrical secondary current loop which expels to the outside of the fusion zone an accumulation of molten material containing oxides and dirt which may be present in the junction zone just prior to the upset of the weld. While flash welds have been characterized by comparatively small upsets and ragged lines of extruded flash and resistance butt welds have been characterized by small upsets with no flash, this new method is characterized by a larger upset, a function of the degree of preheat, and a smooth flowing magnetic expulsion of molten material away from the transformer loop.

The following considerations may be considered as demonstrating what actually occurs during the making of the weld. Assuming the weld is to be made between the flange section 12 and the tube section 10 machined to a 30° bevel with a 1/64" flat annulus, and assuming also that the preheat pressure at the free end of the tube is 450 pounds per square inch, the bearing pressure at the tube end, representing an area with approximately .074 square inch, is about 6000 pounds per square inch. At the instant of welding, when the welding pressure is first applied, the bearing pressure at the tube end may reach a value of 50,000–60,000 pounds per square inch, this maximum value decreasing as the upset progresses in a manner proportional to the increased bearing area at the fusion zone.

The acetylene preheating has a tendency to produce somewhat higher temperatures at the outside portion of the beveled tube area, partly because the outside area is closer to the flames, but also because the inside edge of the tube is in contact with the relatively heavy flange section which keeps this portion of the heated area at a lower temperature. At the flange section a similar heat gradient exists.

The angular direction of the acetylene flames with respect to the surface of the flange preferably forms an included angle of 60°.

Just prior to the instant when the welding current is applied, the beveled surface of the pipe and the flange surface vertically opposite have reached the liquidous stage (approximately 2700 F.), whereas, the area of contact between the tube and the flange is at a temperature of the order of 2350 F. At this elevated temperature the electrical resistance between the tube and flange faces is extremely high, and the application of current of a density of approximately 170,000 amperes per square inch at the contact area produces a momentary melting of the metal at this location. This further increase in resistance at the area of contact results in a slight instantaneous flash which ejects the molten surface metal and any oxides present. Pressure applied at the same time stops the flash and produces a butt weld between oxide free faces.

The immediately foregoing analysis of the welding method phenomena applies to the welding of 1½″ O. D. x ¾″ I. D. low carbon steel pipe to a 5″ O. D. x ½″ thick steel flange. Similar considerations would apply to other shapes that may be welded by this method, except that the current and pressure values and the assembly of the equipment would vary with the type of weld to be formed.

With further reference to the application of the illustrative method to the welding of alloy steels, excellent welds have been produced between a 4–6 chromium steel pipe and flange with the following set-up:

| | |
|---|---:|
| Preheat time _____ minutes__ | 7–9 |
| Preheat pressure pounds per square inch__ | 450 |
| Welding pressure _____ do____ | 4000–5000 |
| Current ___amperes per square inch__ | 13,000 |
| Weld time _____ cycles__ | 34 |
| Power input k. v. a. per square inch__ | 230 |

Welds produced under the above conditions, using a 1½″ O. D. x ¾″ I. D. pipe and a 5″ diameter x ⅝″ thick flange, which had a ⅝″ hole drilled through its center, were very good. The fracture indicated complete absence of oxidation and showed excellent fusion.

The degree of preheat input and welding pressure requirements are somewhat higher than in the case of low carbon steels. A 10% increase in compressive, thermal and electrical energy over the amounts used for low carbon steel is desirable for the welding of 4–6% chromium steel. Since 4–6% chromium steel is of the air hardening type, careful heat treatment of the welded joint is essential.

The illustrative method has also been successfully employed in welding of steel parts containing approximately 18% chromium and approximately 8% nickel with the following setup:

| | |
|---|---:|
| Preheat time _____ minutes__ | 8–13 |
| Preheat pressure pounds per square inch__ | 775 |
| Welding pressure _____ do____ | 7,200 |
| Current _____amperes per square inch__ | 13,000 |
| Weld time _____ cycles__ | 44 |
| Power _____k. v. a. per square inch__ | 230 |

Perfect welds were produced with the above welding technique. The ductility of the welded joint after heat treatment (1950 F. water quench) was excellent and a specimen polished and etched in boiling 1:1 hydrochloric acid showed 100% fusion at the weld.

The compressive, thermal and electric energy requirements for welding 18–8 chromium-nickel steel are considerably higher than for low or unalloyed steels.

Welds are successfully made between 4″ O. D. tube with ½″ wall and 2″ thick flange.

| | |
|---|---:|
| Preheat time _____ minutes__ | 7 |
| Preheat pressure pounds per square inch__ | 450 |
| Welding pressure _____ do____ | 5,000 |
| Current _____amperes per square inch__ | 20,000 |
| Weld time _____ cycles__ | 35 |
| Power _____k. v. a. per square inch__ | 200 |

Fig. 5 of the drawings schematically indicates the interlocking electrical system for effecting the illustrative welding method. This system involves interlocking controls which eliminate personal errors in the welding. These interlocking controls are so arranged that operation of individual parts of the system cannot take place unless all related parts of the system are properly operative. In case of failure of any one of the control circuits, the welding operation would cease to function thereby preventing damage to the equipment, and making of unsatisfactory welds.

Fundamentally, the system illustrated in Fig. 5 may be considered as having three main circuits. They are:
 (a) The pressure circuit;
 (b) The preheating circuit; and
 (c) The power circuit.

Fig. 5 is drawn with conventional symbols and the basic foundation of the scheme is one which is conventional in the representation of such electrical circuits.

As an aid in the understanding of the system indicated in Fig. 5, attention is invited to the fact that the characters CR indicate a control relay, and these characters are prefixed by the number indicating the descriptive number of the particular relay in question. When a circle is drawn around characters CR, the representation is that of a holding coil, and when characters or the same lettering is shown over two parallel lines inserted in the circuit, the indication is that of the contact points on a relay. These are normally open, and they close when the current is placed in the holding coil. When an arrow is drawn through two parallel lines over which the expression CR is given, the indication is that of normally closed contacts which are open when current is put in the holding coils. When open loops are shown in a circuit, it means a coil of wire which, when current flows, sets up a magnetic field around the coil as in a transformer or in a solenoid valve. The pilots shown are pilot lights which come on when the connected circuit is energized.

The 220 volt source is connected to terminals 51, 53, with 110 volt power being available between either of these terminals and terminal 55. Closure of the "Control switch" energizes relay ICR to close its contact and connect the 220 volt power to the lines beyond these contacts, lighting the "Control pilot" lamp. The circuit is now ready for operation.

To initiate the welding cycle, the "Pressure switch" is closed to energize relay 2CR. Closure of contacts 2CR lights the "Water pilot" lamp, and application of 440 volt power to the "Weld-O-Trol" (terminals 50, 52) energizes relay 4CR to close its contacts to light the "Power pilot" lamp. It should be noted that energization of relays 2CR and 4CR closes a pair of series connected, normally open contacts in the energizing circuit of relay 3CR.

Closure of switch 57, which is preferably a push button switch, energizes the gas ignitor transformer 59 to produce and ignition spark at the tip of torch 20. The "Weld" and "Preheat" switches are also closed, completing the energizing circuit for relay 3CR, which closes its own hold circuit around switch 57 and connects the 220 volt power to the circuit beyond the "Air pilot" circuit. Relay 7CR is energized starting the "Clock motors" 61 and completing the energizing circuit for the gas valve solenoid 63 so that torch 20 is lit. The gas preheating under low pressure is thus initiated.

After a pre-settable time interval, the normally closed clock contacts A are opened by the "Clock Motors" and the normally open clock contacts B are closed. This deenergizes the gas valve solenoid 63 and energizes relay 9CR. When relay 9CR is energized, it completes the energizing circuits for relays 5CR and 10CR. Relay 5CR closes the circuits for the high pressure air solenoid 65 and the "Synchronous Timer" 67. The latter closes the welding circuit through the primary winding 54 of transformer 70.

Relay 10CR starts the "Pressure timer," which controls the time interval of application of high pressure to the workpieces. This time is determined by the time it takes for electronic valve BH to charge condenser 77 through the resistance arrangement 72 comprising fixed resistors 73 selectively connectible into series circuit relation with variable resistance 74 and fixed resistor 75. When condenser 77 is fully charged, it fires electronic valve 76 to energize relay 8CR. This relay shunts the valve 76 and opens the circuit of relay 9CR, dropping relays 5CR and 10CR to deactivate the circuits so that the control arrangement is re-set for the next cycle of operation.

This application is a division of the parent application, 527,432, filed on March 21, 1944, now Patent No. 2,467,391, dated April 19, 1949.

What is claimed is:

1. In welding apparatus, a workpiece holder maintaining a plurality of workpieces in operative relationship and under converging pressures, a fuel burner disposed around those parts of the held workpieces within the weld zone for preheating the metal of that zone, electric means applying resistance welding current to the workpieces while the fuel burner remains in its operative position, and means operable to increase the converging pressures on the workpieces during such resistance welding current application.

2. In welding apparatus, a workpiece holder maintaining a plurality of workpieces pressed together in operative relationship, a fuel burner of annular form embracing those parts of the held workpieces within the weld zone for preheating the metal in that zone before the application of resistance welding current, means supplying fluid fuel to the burner, electric means applying a resistance welding current to the workpieces without the removal of the burner, means operable to increase the converging pressure on the workpieces during such resistance welding current application, and a separate metallic filler device within the burner and closely fitting one of the workpieces adjacent the weld zone to control and limit the upset produced by the combined effect of the heat and pressure on the workpieces.

3. In welding apparatus, a workpiece holder including pressure applying mechanism for holding a plurality of workpieces pressed together in operative relationship, a fuel burner covering the weld zone of the workpieces and preheating the metal of that zone before the application of resistance welding current, electric means for applying a resistance welding current to the workpieces while the latter are maintained in said holder and means operable to increase the converging pressure on the workpieces during such resistance welding current application.

4. In welding apparatus, a workpiece holder maintaining a plurality of workpieces pressed into contact in operative relationship during the application of converging pressures thereto, fuel burning means including a burner ring disposed around one of the workpieces and arranged to direct flame into the weld zone of the work pieces for preheating the metal of that zone before the application of the resistance welding current, electric means for applying a resistance welding current to the workpieces while under pressure in said holder, and a metallic seal ring closely fitting said workpiece and disposed within the burner ring to substantially close the space between the burner ring and the workpiece, said seal ring serving to prevent excessive heating of the workpiece and control the shape of the fillet formed during the welding process as a result of the upsetting of the metal of the workpiece.

5. In a welding apparatus, means for applying successive pressures of widely different values to workpieces to be welded, said means including devices for holding the workpieces in operative relationship during the application of successive pressures thereto, means for preheating the weld zone of the workpieces and for automatically controlling the degree and duration of said preheating, means for simultaneously rendering the preheating inoperative as said first mentioned means applies a higher resistance welding pressure on said workpieces, and means for applying to said workpieces a resistance welding current simultaneously with the application of said higher pressure and for timing the application of the welding current so that the application ceases instantly when there has been sufficient heating current applied to the weld zone.

6. In welding apparatus; means preheating weld components while maintaining them in operative relationship and in contact over a limited area; means applying a converging pressure of relatively low value upon the workpieces and maintaining such pressure during the preheating period; said first named means continuing the preheating until metal of the components is upset in the zone of contact and limiting or controlling the upset of the metal of the workpieces during the preheating; means momentarily melting the weld metal at the contact zone by the application of a resistance welding current of high current density whereby the electrical resistance is further increased to cause an instantaneous flash which ejects from the contact zone molten surface metal and any oxide present; and means applying to the workpieces, simultaneously with the application of said current, a converging pressure of a value many times that of the preheat pressure, whereby said flash is stopped and a butt weld is produced between the oxide free faces of the workpieces.

7. In a welding apparatus; means for successively applying pressures of widely different values to workpieces to be welded; said means including devices for holding the workpieces in operative relationship during the application of successive pressures thereto; means including a fuel burner for preheating the weld zone of the workpieces; means for simultaneously rendering the preheating inoperative as said first mentioned means applies a higher resistance welding pressure convergently on said workpieces; means for applying to said workpieces a resistance welding current simultaneously with the application of said higher pressure, and an interlocking electrical system for controlling the sequential operation of said various means and for timing the application of the preheating, pressure, and welding current.

8. In welding apparatus; means preheating weld components while maintaining them in operative relationship and in contact over a limited area; pressure means for applying converging pressures of low value upon the workpieces during the preheating period; said pressure means and preheating means being co-ordinated to limit or control the upset of the metal of the workpieces during the preheating; and means including a control system applying electric resistance welding currents to the weld components while simultaneously applying to the work components a converging pressure of a value many times that of the preheat pressure; said control system automatically controlling the sequential operation of said different means and including a pressure circuit, a preheating circuit and an electrical power circuit.

HOWARD J. KERR.
OTIS R. CARPENTER.
FRANK W. ARMSTRONG, JR.
NICHOLAS C. JESSEN.

REFERENCES CITED

The following references are of record in the file of this patent:

UNITED STATES PATENTS

| Number | Name | Date |
| --- | --- | --- |
| 347,142 | Thomson | Aug. 10, 1886 |
| 434,017 | Fowler | Aug. 12, 1890 |
| 1,205,511 | Butcher | Nov. 21, 1916 |
| 2,345,692 | Westin et al. | Apr. 4, 1944 |

FOREIGN PATENTS

| Number | Country | Date |
| --- | --- | --- |
| 283,630 | Great Britain | Jan. 11, 1928 |